United States Patent
Choi

(10) Patent No.: US 11,197,469 B2
(45) Date of Patent: Dec. 14, 2021

(54) LURE

(71) Applicant: DUEL CO., INC., Fukuoka (JP)

(72) Inventor: Eric Eun-Ha Choi, Fukuoka (JP)

(73) Assignee: DUEL CO., INC., Fukuoka (JP)

( * ) Notice: Subject to any disclaimer, the term of this patent is extended or adjusted under 35 U.S.C. 154(b) by 458 days.

(21) Appl. No.: 16/305,734

(22) PCT Filed: Jul. 3, 2017

(86) PCT No.: PCT/JP2017/024380
§ 371 (c)(1),
(2) Date: Nov. 29, 2018

(87) PCT Pub. No.: WO2019/008643
PCT Pub. Date: Jan. 10, 2019

(65) Prior Publication Data
US 2020/0178510 A1  Jun. 11, 2020

(51) Int. Cl.
| | | |
|---|---|---|
| *A01K 85/00* | (2006.01) | |
| *A01K 85/01* | (2006.01) | |
| *A01K 85/16* | (2006.01) | |
| *A01K 95/00* | (2006.01) | |

(52) U.S. Cl.
CPC .............. *A01K 85/00* (2013.01); *A01K 85/01* (2013.01); *A01K 85/16* (2013.01); *A01K 95/00* (2013.01)

(58) Field of Classification Search
CPC ........ A01K 85/00; A01K 85/01; A01K 85/16; A01K 85/18
USPC .................................. 43/42.39, 42.22, 42.31
See application file for complete search history.

(56) References Cited

U.S. PATENT DOCUMENTS

| | | | | |
|---|---|---|---|---|
| 4,761,910 A | * | 8/1988 | Ninomiya ............... | A01K 85/16 43/42.22 |
| 11,000,022 B2 | * | 5/2021 | Choi ....................... | A01K 85/16 |
| 2016/0366864 A1 | * | 12/2016 | Choi ....................... | A01K 85/16 |

FOREIGN PATENT DOCUMENTS

| | | |
|---|---|---|
| CN | 201602062 U | 10/2010 |
| CN | 203206992 U | 9/2013 |
| CN | 203206993 U | 9/2013 |
| CN | 105517431 A | 4/2016 |
| JP | 63-20766 U | 2/1988 |

(Continued)

OTHER PUBLICATIONS

Translation of JP 2000-224941 (Year: 2000).*

(Continued)

*Primary Examiner* — Darren W Ark
(74) *Attorney, Agent, or Firm* — Westerman, Hattori, Daniels & Adrian, LLP

(57) ABSTRACT

A lure includes a body, a sinker moving space running in a front and back direction inside the body, a pair of rails provided in the sinker moving space, running in the front and back direction, a sinker housed in the sinker moving space, and a support projecting in a left and right direction of the sinker, the sinker being movable on the pair of rails with the support in the front and back direction, and the pair of rails each including a first rail section positioned in a rear side of the sinker moving space, and a second rail section positioned in a front side of the sinker moving space, having a rear end positioned below a front end of the first rail section, wherein a stopper capable of stopping the sinker is provided between the first rail section and the second rail section.

2 Claims, 15 Drawing Sheets

(56) References Cited

FOREIGN PATENT DOCUMENTS

| | | | | |
|---|---|---|---|---|
| JP | 3-15021 | Y2 | | 4/1991 |
| JP | 08205712 | A | * | 8/1996 |
| JP | 10295223 | A | * | 11/1998 |
| JP | 10327708 | A | * | 12/1998 |
| JP | 11187783 | A | * | 7/1999 |
| JP | 2000139276 | A | * | 5/2000 |
| JP | 2000224941 | A | * | 8/2000 |
| JP | 2001299150 | A | * | 10/2001 |
| JP | 2002330668 | A | * | 11/2002 |
| JP | 2002-360124 | A | | 12/2002 |
| JP | 2002-360125 | A | | 12/2002 |
| JP | 2003061516 | A | * | 3/2003 |
| JP | 2003274798 | A | * | 9/2003 |
| JP | 2003289759 | A | * | 10/2003 |
| JP | 2004222521 | A | * | 8/2004 |
| JP | 2004222522 | A | * | 8/2004 |
| JP | 2005287359 | A | * | 10/2005 |
| JP | 2005287360 | A | * | 10/2005 |
| JP | 2005333890 | A | * | 12/2005 |
| JP | 2011030459 | A | * | 2/2011 |
| JP | 2011030461 | A | * | 2/2011 |
| JP | 2011050374 | A | * | 3/2011 |
| JP | 2011055710 | A | * | 3/2011 |
| JP | 2011229423 | A | * | 11/2011 |
| JP | 2012044963 | A | * | 3/2012 |
| JP | 4969297 | B2 | * | 7/2012 |
| JP | 2012231699 | A | * | 11/2012 |
| JP | 2017-112930 | A | | 6/2017 |
| WO | WO-9421112 | A1 | * | 9/1994 ............. A01K 85/16 |
| WO | 2016/092668 | A1 | | 6/2016 |
| WO | WO-2016092668 | A1 | * | 6/2016 ............. A01K 85/16 |
| WO | WO-2018003354 | A1 | * | 1/2018 ............. A01K 85/16 |

OTHER PUBLICATIONS

Office Action dated Oct. 19, 2020, issued in counterpart to CN Application No. 201780032656.3, with English Translation. (11 pages).

International Search Report in Japanese dated Oct. 3, 2017, issued in counterpart International Application No. PCT/JP2017/024380 (3 pages).

* cited by examiner

LURE

TECHNICAL FIELD

The present invention relates to a lure having a sinker movably housed in a body and a center of gravity that is shifted as the sinker moves back and forth.

BACKGROUND ART

Among the lures used for fishing, a center of gravity shifting lure that can shift its center of gravity has been conventionally known (Patent Literature 1). In such a lure, a spherical sinker rolls in a sinker moving space running in a body, which therefore shifts its center of gravity back and forth.

Specifically, in the center of gravity shifting lure of Patent Literature 1, the spherical sinker is attracted and held in a front end of the sinker moving space by a retainer (such as a magnet) provided in the front end of the sinker moving space before casting. At this point of time, the center of gravity of the lure is deviated to a front side as the spherical sinker is retained in the front side.

When this lure is casted, the spherical sinker is not attracted and held by the retainer anymore due to an inertial force, and the spherical sinker rolls to a rear side of the sinker moving space. When the spherical sinker rolls to the rear side of the sinker moving space, the center of gravity of the lure is shifted to the rear side, and thus the lure can be casted in a stable manner. As a result, the lure can be casted relatively a long distance. When a fishing line is pulled (reeled) after the lure lands in water, the spherical sinker rolls to the front side and is again attracted and held by the retainer provided in the front end of the sinker moving space. The lure having the center of gravity shifted to the front side swims like a real fish.

In the center of gravity shifting lure of Patent Literature 1, the spherical sinker is attracted to the retainer provided in the front end of the sinker moving space, and thus the spherical sinker is held in the front end of the sinker moving space. However, in this lure, the retainer is provided in the front end of the sinker moving space and the sinker is in a spherical shape. Thus, when the lure lands in water, the spherical sinker rolls fast to the front side of the sinker moving space and collides with the retainer. For that reason, the retainer may be broken when this lure is used for a long period of time. With a broken retainer, the spherical sinker is less likely to be held in the front end of the sinker moving space while the lure swims, and therefore the lure may not swim like a real fish.

Further, while this lure swims in water after landing, the spherical sinker may fall off the retainer and roll to the rear side of the sinker moving space, and the center of gravity may be shifted to the rear side. Especially when the lure is vigorously moved right to left and up and down in water, the spherical sinker may relatively easily fall off the retainer and roll to the rear side. Accordingly, when the center of gravity of the spherical sinker is shifted to the rear side of the lure while swimming, the lure may not swim like a real fish.

[Patent Literature 1] Japanese Utility Model Publication No. 3-15021

SUMMARY OF THE INVENTION

An object of the present invention is to provide a lure in which a sinker moves smoothly to a front side of a sinker moving space after landing in water, the sinker is easily held in the front side of the sinker moving space while the lure swims even when the lure is used for a long period of time, and the sinker is less likely to move to a rear side of the sinker moving space even when the lure is vigorously moved right to left and up and down in water.

As described above, when the conventional lure is used for a long period of time, the spherical sinker collides with the retainer, causing the retainer to break. Accordingly, it may be difficult for the spherical sinker to be held in the front side of the sinker moving space while the lure swims. In response to this issue, the present inventor first made an attempt to use no retainer and change a shape of the sinker to non-sphere. That is, the present inventor considered that if the sinker is non-sphere and a contact area between a bottom face of the sinker moving space and the sinker is made larger, a frictional force between the sinker and a lower face of the sinker moving space becomes large and thus the sinker is less likely to move from the front side to the rear side while the lure swims (in other words, the sinker is readily held in the front side of the sinker moving space while the lure swims), and also, the breakage of the retainer does not occur if the retainer is removed from the lure. Although these ideas are right, the above changes create a new issue that with a large frictional force between the sinker and the lower face of the sinker moving space, the sinker is less likely to move from the rear side to the front side of the sinker moving space after the lure lands in water.

Based on the above finding, the present inventor made an extensive research on the lure that has a well-balanced combination of a first feature in which the sinker is movable relatively smoothly from the rear side to the front side of the sinker moving space after landing in water and a second feature in which the sinker is less likely to move from the front side to the rear side even when the lure is vigorously moved right to left and up and down after landing in water. As a result of the research, the present inventor completed the present invention.

The lure of the present invention includes a body; a sinker moving space running in a front and back direction inside the body; a pair of rails provided in the sinker moving space, running in the front and back direction; a sinker housed in the sinker moving space; and a support projecting in a left and right direction of the sinker, the sinker being movable on the pair of rails with the support in the front and back direction, and the pair of rails each including: a first rail section positioned in a rear side of the sinker moving space; and a second rail section positioned in a front side of the sinker moving space, having a rear end positioned below a front end of the first rail section, wherein a stopper capable of stopping the sinker is provided between the first rail section and the second rail section.

In the lure of the present invention, the stopper preferably includes a third rail section positioned between the second rail section and the first rail section, the third rail section running downward from the front end of the first rail section.

In the lure of the present invention, the support preferably includes a first shaft projecting in the left and right direction of the sinker on a front side of the sinker, and a second shaft projecting in the left and right direction of the sinker on a rear side of the sinker.

In the lure of the present invention, the sinker is movable on the pair of rails with the support in the front and back direction, and the pair of rails have the first rail section positioned in the rear side of the sinker moving space and the second rail section positioned in the front side of the sinker moving space, having the rear end positioned below the front end of the first rail section. This enables the sinker to move to the front side of the sinker moving space in a relatively easy manner after the lure lands in water.

Further, the lure of the present invention is provided with the stopper between the first rail section and the second rail section. Thus, the sinker is less likely to move from the front side to the rear side even when the lure is moved right to left and up and down in water after landing.

DESCRIPTION OF THE EMBODIMENTS

Hereinafter, a lure according to a first embodiment of the present invention will be described with reference to FIGS. 1 to 11, and then lures according to second to ninth embodiments will be described with reference to FIGS. 12 to 21. The lures according to the second to ninth embodiments will be described by pointing to differences from a lure that will have already described and by appropriately eliminating the description of common features and operations and effects. Note that a dimension of each figure is different from an actual dimension. Each of the sectional views to be referred when the second to ninth embodiments will be described is a view taken along the same line as the lure according to the first embodiment.

Figure 1:
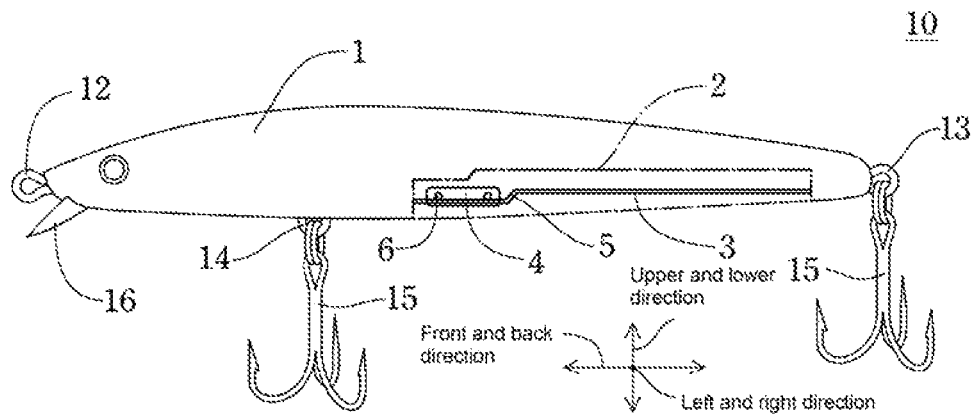
FIG. 1 is a side view viewed from a right side of a lure according to a first embodiment of the present invention.
Figure 2:
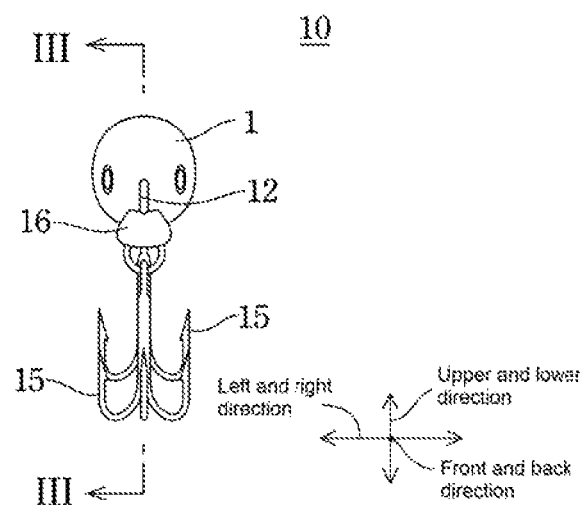
FIG. 2 is a front view viewed from a front side of the lure according to the first embodiment of the present invention.

In this specification, a side that the lure swims forward when a fishing line connected to a fishing line connecting portion of the body is pulled in water is referred to as a "front side", a side opposite to the front side is referred to as a "rear side", and a direction connecting the front side and the rear side is referred to as a "front and back direction". Based on the lure at the time of swimming, a side toward a surface of water is referred to as an "upper side", a side opposite to the upper side is referred to as a "lower side", and a direction connecting the upper side and the lower side is referred to as an "upper and lower direction". Further, when the lure swimming in water is viewed from the front side, a direction connecting a "left side" and a "right side" is referred to as a "left and right direction". The "left and right direction" is perpendicular to the "front and back direction" and the "upper and lower direction". When a side view of a lure 10 illustrated in FIG. 1 is taken as an example, the left side of the paper corresponds to the "front side", the right side of the paper corresponds to the "rear side", the upper side of the paper corresponds to the "upper side", and the lower side of the paper corresponds to the "lower side". Further, when a front view of the lure 10 illustrated in FIG. 2 is taken as an example, the left side of the paper corresponds to the "left side" and the right side of the paper corresponds to the "right side".

Additionally, in this specification, based on a sinker 4 housed in a sinker moving space 2, a side away from the sinker 4 is referred to as an "outward" and a side close to the sinker 4 is referred to as an "inward", and these are independent from the above-described "front and back direction", "upper and lower direction", and "left and right direction". For example, an "inwardly in the left and right direction" means the side close to the sinker 4 in the left and right direction, and an "outwardly in the left and right direction" means the side away from the sinker 4 in the left and right direction.

Moreover, in this specification, when describing the dimension of each member composing the lure 10, the length in the upper and lower direction is referred to as a "height", the length in the front and back direction is referred to as a "depth", and the length in the left and right direction is referred to as a "width".

First Embodiment

Figure 3:
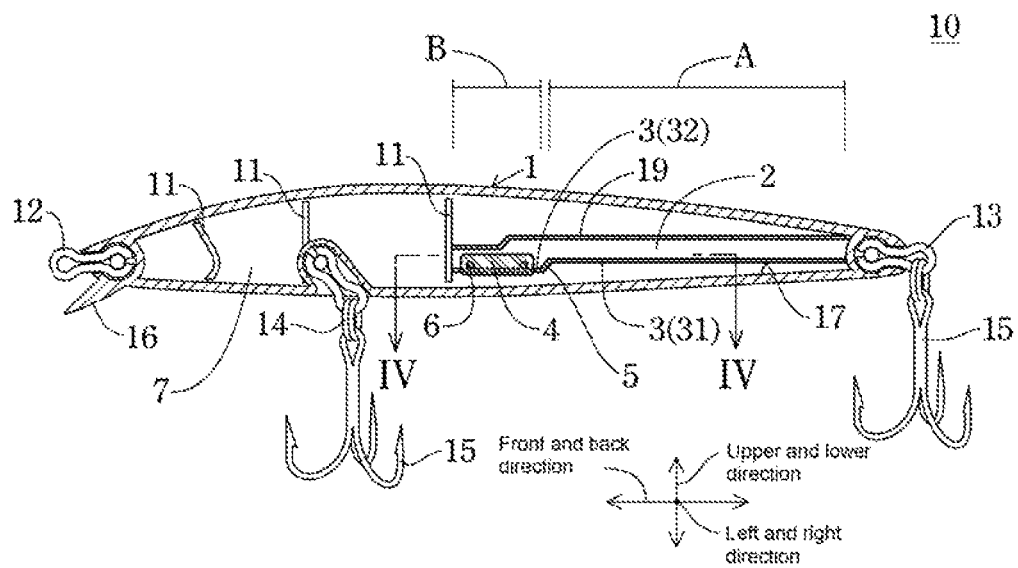
FIG. 3 is a vertical sectional view taken along a line III-III of the lure in FIG. 2.
Figure 4:
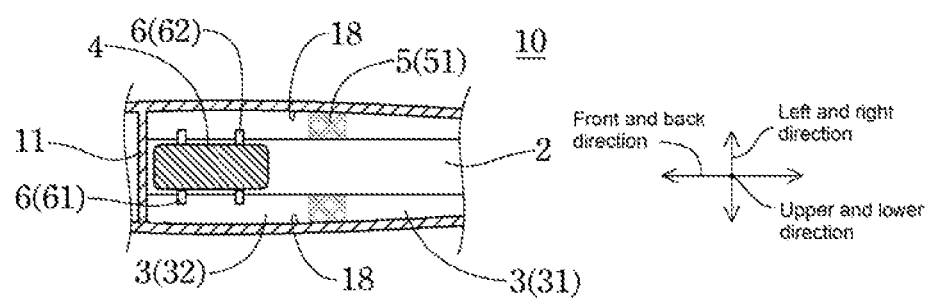
FIG. 4 is a horizontal sectional view taken along a line IV-IV of the lure in FIG. 3.

FIG. 1 to FIG. 11 illustrate a lure 10 according to the first embodiment of the present invention or members thereof. In this application, a fishing line connecting portion 12, first and second hook connecting portions 13, 14, and a combined hook 15 included in a body 1 are not hatched in view of visibility of the drawings. As a matter of convenience, FIG. 1 illustrates a sinker moving space 2 provided inside the lure 10 by a dot-and-dash line, and illustrates rails 3, a sinker 4, a support 6, and a stopper 5 provided in the sinker moving space 2. Additionally, the horizontal sectional view in FIG. 4 illustrates the stopper 5 by a grid-like pattern as a matter of convenience (the same is true for FIG. 14A, FIG. 15A, and FIG. 15B).

As illustrated in FIG. 1 to FIG. 6, the lure 10 of the present invention includes the body 1, the sinker moving space 2 running in the front and back direction inside the body 1, and the sinker 4 housed in the sinker moving space 2. Hereinafter, the lure 10 of the first embodiment will be described by separately describing each composing members.

[Body]

The body 1 is a core part of the lure 10. A shape of the body 1 is not limited to a particular shape and may be a shape imitating a whole or a part of a real bait which is preyed by a target fish (a fish to be caught) or a shape having no relation to the real bait. However, the body 1 may preferably be in a shape imitating a whole or a part of the real bait to achieve a better catch. When the shape is an imitation of a part of the real bait, the part to be imitated is not limited to a particular part and can be appropriately changed according to kinds of the target fish. However, the shape is preferably a shape imitating a head of the real bait. In this embodiment, as illustrated in FIG. 1, the body 1 is in a shape imitating a whole of a small fish.

It is preferable that an infinite number of small cavities (dimples) are formed on an outer surface of the body 1 (not illustrated). The infinite number of small cavities on the outer surface of the body 1 makes the lure 10 difficult to receive an air resistance and thus allows the lure 10 to be casted further at the time of casting of the lure 10.

The body 1 itself preferably floats on water (including fresh water and sea water). A specific gravity of the body 1 is not limited to a particular value and is, for example, 1.1 or less, preferably 1 or less, more preferably 0.9 or less, particularly preferably 0.6 or less. The specific gravity of the body 1 refers to a specific gravity of the body 1 itself and not a specific gravity of a formation material for the body 1.

The body 1 may be colored in such a way as to attract an interest of the target fish. This coloring may be done by imitating parts (eyes, gills, scales, and the like) of the real bait or by painting patterns having no relation to the real bait. In this embodiment, the body 1 has a pattern imitating eyes of the real bait.

The formation material for the body 1 is not limited to a particular material, and examples thereof include a rigid synthetic resin such as an ABS resin; a soft synthetic resin such as a urethane; a synthetic resin foam such as a urethane foam; wood; and a combination of two or more materials selected from these materials. The body 1 is preferably made of a rigid synthetic resin, a soft synthetic resin, a synthetic resin foam, or a combination of two or more of these materials, and more preferably made of a rigid synthetic resin (including a rigid synthetic resin foam). The body 1 may be hollow or solid. The solid body 1 is the body 1 having no space therein except for the sinker moving space 2, and the hollow body 1 is the body 1 having the sinker moving space 2 and a space other than the sinker moving space 2. In this embodiment, as illustrated in FIG. 3, the hollow body 1 having a space (hereinafter, referred to as a different space 7) other than the sinker moving space 2 is employed. A formation of the different space 7 inside the body 1 allows a body 1 having a specific gravity of less than 1 to be produced easily even when a material having a specific gravity of more than 1 (such as an ABS resin, for example) is used.

A reinforced member may be provided in the different space 7 of the body 1 to increase a mechanical strength of the body 1. In this embodiment, as illustrated in FIG. 4, a plate-like reinforced member 11 is projected from a lateral face (hereinafter, referred to as an inner face 18) inside the body 1. In this embodiment, three reinforced members 11 are provided. However, the number of the reinforced member 11 is not limited to a particular number and may be less than three or more than three. The number of the reinforced members 11 is preferably three to seven in view of making the specific gravity of the body 1 small. In this embodiment, the reinforced member 11 is integrated with the body 1.

Figure 5:
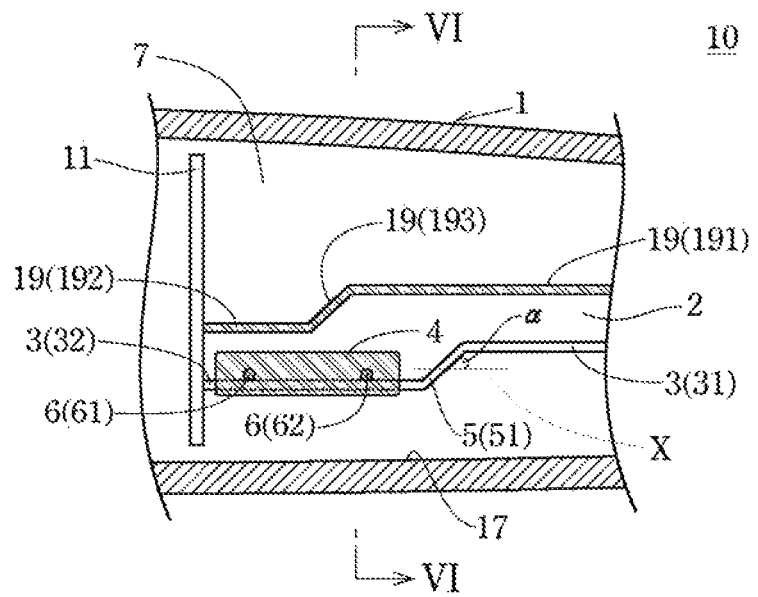
FIG. 5 is a partially enlarged vertical sectional view of the lure in FIG. 3.

In this embodiment, as illustrated in FIG. 3 to FIG. 5, the reinforced member 11 is provided over a front end of a partition wall 19 and a front end of the rails 3 described below.

An annular fishing line connecting portion 12 for engaging a fishing line is protrudingly provided in a front side of a front end of the body 1. For example, the fishing line connecting portion 12 is composed of one of rings formed of a substantially 8-shaped metal wire rod having a ring at each end. The fishing line connecting portion 12 is protrudingly provided outside the body 1 by engaging one ring with a support shaft in the body 1 while protruding the other ring of the metal wire rod, and fixing the middle part of the metal wire rod to a housing in the body 1.

An annular first hook connecting portion 13 for attaching a hook is protrudingly provided in a rear side of a rear end of the body 1. Like the fishing line connecting portion 12, the first hook connecting portion 13 is formed of a substantially 8-shaped metal wire rod and is fixed to the body 1 in the same manner.

An annular second hook connecting portion 14 for attaching a hook is protrudingly provided in a lower side of a middle section of the body 1 in the front and back direction. Like the fishing line connecting portion 12, the second hook connecting portion 14 is formed of a substantially 8-shaped metal wire rod.

Hooks attached to the first hook connecting portion 13 and the second hook connecting portion 14, respectively, are not limited to a particular hook, and may be a combined hook 15 including a plurality of hooks (for example, a treble hook) as illustrated, or a single hook including only one hook.

Further, a water stream resistive plate 16 projecting forward is provided below the fishing line connecting portion 12 of the body 1. In this embodiment, the water stream resistive plate 16 is integrated with the body 1. The water stream resistive plate 16 has a function of swaying the lure 10 in water. That is, when the lure 10 is pulled in water, a water stream hits the water stream resistive plate 16, which causes the lure 10 to sway. However, the lure 10 of the present invention may not have such a water stream resistive plate 16.

Figure 7:
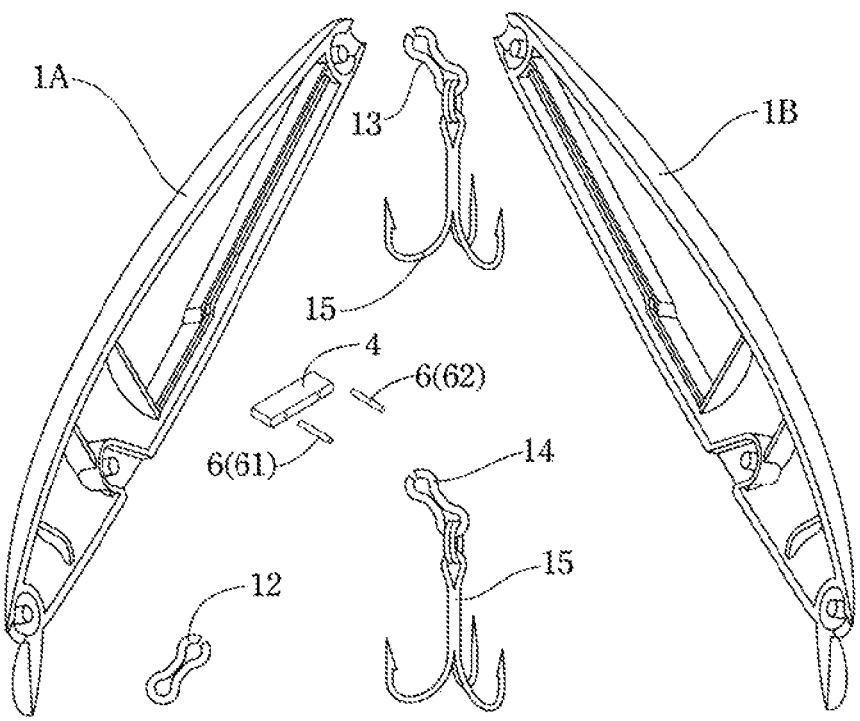
FIG. 7 is an exploded perspective view of each member composing the lure according to the first embodiment of the present invention.

The body 1 is generally made by bonding a plurality of components to each other. For example, as illustrated in FIG. 7, the body 1 is formed by bonding a pair of bilaterally symmetrical half components 1A, 1B to each other with an adhesive or the like. In the case of the body 1 made by bonding the pair of half components to each other, the sinker moving space 2 and the different space 7 can be readily formed inside the body 1 and also the sinker 4 and the support 6 described below can be readily housed in the sinker moving space 2.

FIG. 7 illustrates all members composing the lure 10 of this embodiment (the half components 1A, 1B, the fishing line connecting portion 12, the first and second hook connecting portions 13, 14, the combined hook 15, the sinker 4, and the support 6).

[Sinker Moving Space and Rails]

The sinker moving space 2 is a space running in the front and back direction inside the body 1, and houses the sinker 4 and the support 6 described below.

The sinker moving space 2 may be a closed space (a space that is not communicated with the different space 7) or may be an unclosed space (a space that is communicated with the different space 7) on the condition that the sinker moving space 2 can house the sinker 4 and the support 6.

In this embodiment, as illustrated in FIG. 1 to FIG. 6 (FIG. 3, FIG. 5, and FIG. 6 in particular), the sinker moving space 2 is a space defined by a lower face inside the body 1 (hereinafter, an inner lower face 17), a pair of inner faces 18 provided in a standing manner from the inner lower face 17 to an upper side, a lower face of the partition wall 19 that is provided in a middle section of the pair of inner faces 18 in the upper and lower direction and is running in the front and back direction, a rear end face inside the body 1, and a rear face of the reinforced member 11. In this embodiment, as illustrated FIG. 5, a small airspace is formed between a lower end of the reinforced member 11 and the inner lower face 17, and thus the sinker moving space 2 is communicated with the different space 7. Accordingly, the sinker moving space 2 is an unclosed space in this embodiment. However, the sinker moving space 2 can be formed as a closed space by connecting the reinforced member 11 and the inner lower face 17 (not illustrated).

Although not particularly illustrated, in a case where the body 1 does not have the different space 7, the sinker moving space 2 defined by the formation material for the body 1 naturally becomes a closed space.

Figure 6:
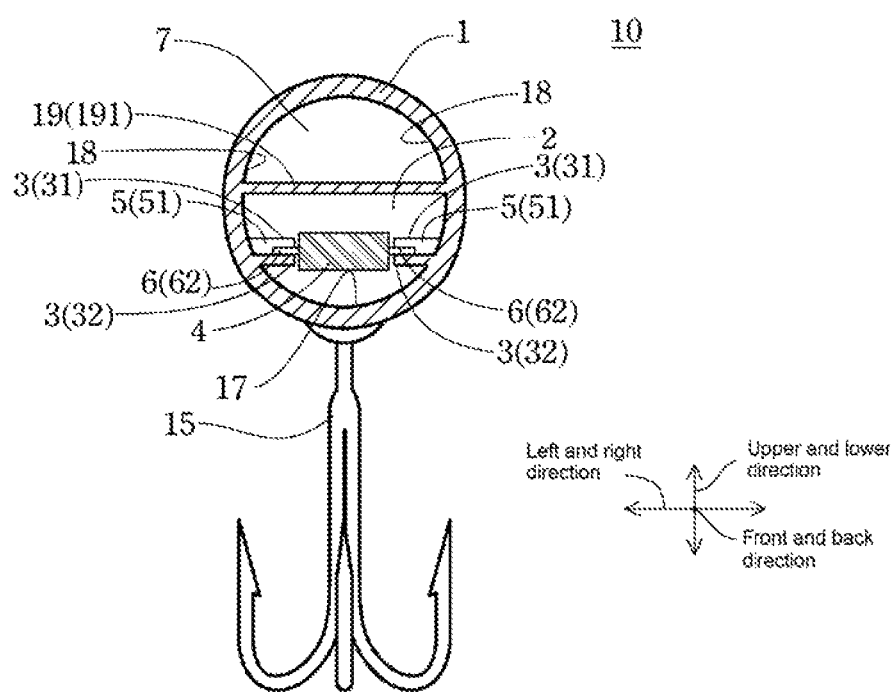
FIG. 6 is a vertical sectional view taken along a line VI-VI of the lure in FIG. 5.

In this embodiment, as illustrated in FIG. 6, a vertical sectional shape of the sinker moving space 2 is a substantially semicircular shape. However, the vertical sectional shape of the sinker moving space 2 is not limited to a substantially semicircular shape, and for example, a substantially circular shape, a substantially elliptical shape, a substantially polygonal shape (for example, a substantially triangular shape or a substantially rectangular shape), or the like can be employed (not illustrated). The vertical sectional shape of the sinker moving space 2 can be changed by appropriately modifying the shape of the partition wall 19 or the inner lower face 17 and the inner face 18 inside the body 1.

In a case where the vertical sectional shape of the sinker moving space 2 is a substantially semicircular shape as in this embodiment or a substantially circular shape or a substantially elliptical shape, there is no clear boundary between the inner lower face 17 and the pair of inner faces 18 of the body 1. In this case, a lowermost part inside the sinker moving space 2 corresponds to the inner lower face 17.

A height of the sinker moving space 2 (a maximum length from the lower face of the partition wall 19 to the inner lower face 17) is not limited to a particular height and is 5 mm to 20 mm, for example. A depth of the sinker moving space 2 (a length in the front and back direction from the rear end to the front end (a rear face of the reinforced member 11 in this embodiment) of the sinker moving space 2) is not limited to a particular depth and is 50 mm to 100 mm, for example. A width of the sinker moving space 2 (a maximum length between the pair of inner faces 18) is not limited to a particular width and is 5 mm to 20 mm, for example.

The sinker moving space 2 is provided with a pair of rails 3 running in the front and back direction. As illustrated in FIG. 6, the pair of rails 3 is a long projection projecting inwardly in the left and right direction from the middle section of the pair of inner faces 18 in the upper and lower direction. These rails 3 support the sinker 4 described below. In this embodiment, the rails 3 are formed integrally with the body 1, that is, the rails 3 are formed integrally with the pair of inner faces 18 without using any connecting means. For that reason, the formation material for the rails 3 is the same as the formation material for the body 1. However, the rails 3 and the body 1 may be formed independently and connected to each other by an appropriate connecting means (such as an adhesive) (not illustrated). In this case, the formation material for the rails 3 may be the same as or different from that for the body 1. When the rails 3 and the body 1 are independent from each other, a metal having a high wear resistance such as aluminum, stainless, and tungsten is preferably used as a formation material for the rails 3. Using a metal having a high wear resistance as a formation material for the rails 3 can effectively prevent wear of the rails 3 caused by the sinker 4 moving in the front and back direction.

In the present invention, the pair of rails 3 includes a first rail section 31 positioned in a rear side of the sinker moving space 2 and a second rail section 32 positioned in a front side of the sinker moving space 2, having a rear end positioned below a front end of the first rail section 31. In this embodiment, both the first rail section 31 and the second rail section 32 run parallel to the front and back direction.

The partition wall 19 is provided in an upper side of the first rail section 31 and the second rail section 32 and prevents the sinker 4 from moving to the upper side and beyond the partition wall 19 (that is, prevents the sinker 4 from moving out of the sinker moving space 2). Hereinafter, a part of the partition wall 19 positioned in the upper side of the first rail section 31 is referred to as a first wall 191, and a part of the partition wall 19 positioned in the upper side of the second rail section 32 is referred to as a second wall 192. In this embodiment, as illustrated in FIG. 5, the first wall 191 runs parallel to the first rail section 31, and the second wall 192 runs parallel to the second rail section 32. Further, a front end of the first wall 191 is positioned rather forward of the front end of the first rail section 31, and a rear end of the second wall 192 is positioned rather forward of the rear end of the second rail section 32. Moreover, the rear end of the second wall 192 is positioned below the front end of the first wall 191, and the rear end of the second wall 192 and the front end of the first wall 191 are connected by a third wall 193. In this embodiment, the third wall 193 is an inclined face inclining downward from the rear side to the front side. Although not particularly illustrated, the third wall 193 may be a vertical face running parallel to the upper and lower direction (in this case, a position of the front end of the first wall 191 is the same as a position of the rear end of the second wall 192 when viewed in the front and back direction).

Although a distance between the first rail section 31 and the first wall 191 in the upper and lower direction is appropriately set on the condition that the sinker 4 on the first rail section 31 is not in contact with the first wall 191, it is usually 3 mm to 5 mm. A distance between the second rail section 32 and the second wall 192 in the upper and lower direction is usually 5 mm to 8 mm.

Although a distance between the first rail section 31 and the inner lower face 17 of the body 1 in the upper and lower direction is appropriately set on the condition that the sinker 4 on the rails 3 is not in contact with the inner lower face 17 of the body 1, and it is preferably as short as possible (that is, the rails 3 are positioned below the sinker moving space 2 as much as possible). The lower the rails 3 are positioned, the lower the sinker 4 is positioned, which allows the lure 10 to have a low center of gravity. As a result, the lure 10 can swim in a stable manner. A distance between the first rail section 31 and the inner lower face 17 of the body 1 in the upper and lower direction is usually 5 mm to 10 mm. A distance between the second rail section 32 and the inner lower face 17 of the body 1 in the upper and lower direction is usually 3 mm to 7 mm.

A depth of the rails 3 is not limited to a particular depth and is 50 mm to 100 mm, for example. The rails 3 are provided from the rear end to the front end of the sinker moving space 2 in this embodiment (that is, the rails 3 are provided over the entire sinker moving space 2 in the front and back direction). Thus, the depth of the rails 3 is the same as the depth of the sinker moving space 2.

However, the rails 3 may not be provided over the entire sinker moving space 2 in the front and back direction, and for example, a sound absorbing member such as a sponge may be provided in the rear end and the front end of the sinker moving space 2 in place of the rails 3 (not illustrated). Such a sound absorbing member provided in the rear end and the front end of the sinker moving space 2 can effectively prevent the sinker 4 from breaking the body 1 or the reinforced member 11 by colliding with these members when the sinker 4 moves to the rear end or the front end of the sinker moving space 2.

In the present invention, as illustrated in FIG. 3, a depth A of the first rail section 31 is preferably longer than a depth B of the second rail section 32. Specifically, a ratio of the depth A and the depth B (A/B) is preferably 5/1 to 4/3, more preferably 3/1 to 4/3. Setting the depth A of the first rail section 31 longer than the depth B of the second rail section 32 can effectively prevent the sinker 4 from suddenly moving from the first rail section 31 to the second rail section 32 inside the lure 10 while casting it in the air.

A width of the first and second rail sections 31, 32 is not limited to a particular width on the condition that a support 6 described below can support the sinker 4. Although the width can be appropriately set according to a size of the sinker 4 and the support 6 described below and the width of the sinker moving space 2, the width is usually independently set as 1 mm to 3 mm, preferably 1 mm to 2 mm.

In this embodiment, as illustrated in FIG. 4 and FIG. 6, each end of the first and second rail sections 31, 32 runs parallel to the front and back direction, and each end of the first and second rail sections 31, 32 may run non-parallel to the front and back direction (not illustrated).

[Stopper]

A stopper 5 capable of stopping the sinker 4 described below is provided between the first rail section 31 and the second rail section 32. The stopper 5 is a member for stopping the sinker 4 from moving from the second rail section 32 to the first rail section 31 while the lure 10 swims in water.

In this embodiment, as illustrated in FIG. 4 to FIG. 6, a third rail section 51 running downward from the front end of the first rail section 31 is used as the stopper 5. Specifically, in this embodiment, the third rail section 51 inclines downward from the front end of the first rail section 31 to the front side of the sinker moving space 2, having a front end connected to the rear end of the second rail section 32.

In this embodiment, like the first and second rail sections 31, 32, the third rail section 51 is a long projection projecting inwardly in the left and right direction from the middle section of the pair of inner faces 18 of the sinker moving space 2 in the upper and lower direction.

Figure 8:
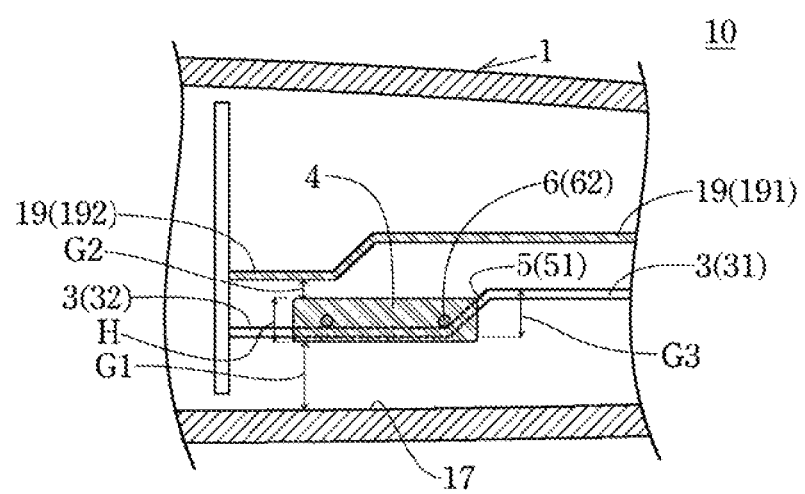
FIG. 8 is a vertical sectional view illustrating that a sinker is stopped by a stopper inside the lure according to the first embodiment of the present invention.

When the lure 10 is tilted downward from the front side to the rear side while the sinker 4 is positioned on the second rail section 32, the sinker 4 tends to move to the rear side of the sinker moving space 2 (first rail section 31). However, as illustrated in FIG. 8, the support 6 collides with the third rail section 51 as a stopper 5 running downward from the front end of the first rail section 31, which consequently prevents the sinker 4 from moving further back than the third rail section 51 in this embodiment. Accordingly, even if the lure 10 is vigorously moved in water, the sinker 4 is less likely to move from the second rail section 32 to the first rail section 31. Therefore, the lure 10 of the present invention can swim in water in a stable manner, and this consequently leads to an excellent catch.

An inclination angle α of the third rail section 51 (an interior angle formed by an intersection of the third rail section 51 and a horizontal plane X running in the front and back direction) illustrated in FIG. 5 is not limited to a particular angle and is usually 10° to 90°, preferably 10° to 80°. When the inclination angle α is in the above range, a position of the sinker 4 can be firmly secured on the second rail section 32, and thus the sinker 4 is less likely to move to the first rail section 31 even if the lure 10 is vigorously moved in water.

[Sinker]

The sinker 4 is housed in the sinker moving space 2 and is a member for causing the center of gravity of the lure 10 to move by moving in the sinker moving space 2 in the front and back direction. In the present invention, as illustrated in FIG. 9, the sinker 4 is provided with the support 6 projecting in the left and right direction. The sinker 4 is movable in the front and back direction with the support 6 on the above-described pair of rails 3. That is, the sinker 4 is on the rails 3 through the support 6, and tilting the lure 10 causes the sinker 4 to move on the rails 3 in the front and back direction. The sinker 4 is not on the rails 3.

In the present invention, the sinker 4 is on the rails 3 with the support 6 and thus a shape of the sinker has almost no effect on its movement in the front and back direction. For that reason, the shape of the sinker 4 is not limited to a particular shape and can be any shape. However, the sinker 4 is preferably in a shape of which the center of gravity is positioned as low as possible. A low center of gravity of the sinker 4 makes the center of gravity of the lure 10 low, which makes the lure 10 to swim easily in water in a stable manner.

Figure 9A:
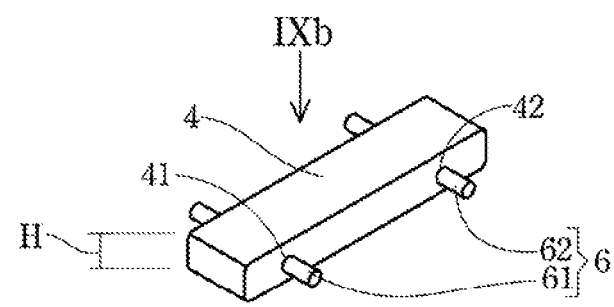
FIG. 9A is a perspective view of the sinker and a support used in the lure according to the first embodiment of the present invention.
Figure 9B:
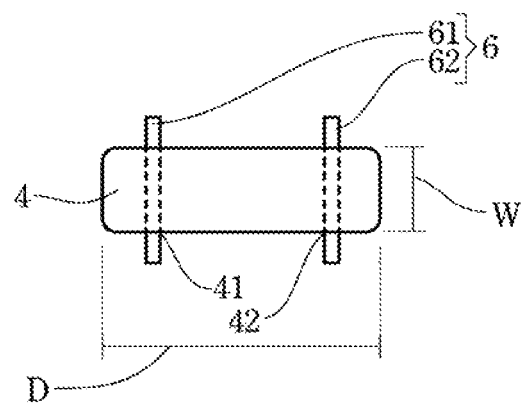
FIG. 9B is a top view of the sinker in FIG. 9A viewed from a direction indicated by an arrow IXb.

For example, as illustrated in FIG. 9A and FIG. 9B, the sinker 4 in this embodiment is formed in a substantially rectangular parallelepiped shape having a height H sufficiently smaller than a depth D. The shape of the sinker 4 is not limited to a substantially rectangular parallelepiped shape and may be a substantially cylindrical shape, a substantially truncated pyramid shape, or an indefinite shape (not illustrated). The sinker 4 is preferably in a substantially rectangular parallelepiped shape. When the sinker 4 is in a substantially rectangular parallelepiped shape, the center of gravity can be made sufficiently lower than that of a spherical sinker having the same volume as the sinker 4.

A lower limit of a ratio of the height H and the depth D (H/D) of the sinker 4 is preferably 1/10, more preferably 3/10, further preferably 1/5. An upper limit of the ratio of the height H and the depth D (H/D) of the sinker 4 is preferably 3/4, more preferably 2/3. A specific height H and depth D of the sinker 4 can be appropriately set in view of a size of the sinker moving space 2. As described below, the sinker 4 is positioned in the front side of the sinker moving space 2 and on the second rail section 32 after the lure 10 lands in water. For that reason, the depth D of the sinker 4 is shorter than the depth B of the second rail section 32. The height H of the sinker 4 is sufficiently shorter than the height of the sinker moving space 2.

A width W of the sinker 4 is not limited to a particular width on the condition that the width W is shorter than the width of the sinker moving space 2. In this embodiment, as illustrated in FIG. 9, the support 6 is projected from lateral faces of the sinker 4, and thus the lateral faces of the sinker 4 need to be positioned between the pair of rails 3 when the sinker 4 is on the rails 3. Accordingly, the width W of the sinker 4 is shorter than a distance between the ends of the pair of rails 3 (see FIG. 6).

A formation material for the sinker 4 is not limited to a particular material, and a formation material that is as heavy as possible is preferably used in terms of positioning the center of gravity of the lure 10 as low as possible. However, a too heavy sinker 4 leads to an increase in a frictional force between the sinker 4 and the rails 3, which may cause the sinker 4 not to move back and forth smoothly on the rails 3. In view of this, a lower limit of a specific gravity of the formation material for the sinker 4 is 2, preferably 5, more preferably 7. An upper limit thereof is 20, preferably 18, more preferably 15. The specific gravity refers to a ratio of mass of the formation material to mass of water (standard substance) at 4° C. under an atmospheric pressure.

Examples of the formation material satisfying the specific gravity of the above range include pure metals such as iron, nickel, cobalt, tungsten, copper, and lead and an alloy of these pure metals. The formation material for the sinker 4 is preferably lead, a lead alloy, tungsten, or a tungsten alloy, more preferably a tungsten alloy containing at least one metal selected from nickel, iron, and copper, other than tungsten. The tungsten alloy contains tungsten in an amount of preferably 70% by mass or more, more preferably 80% by mass or more. As a tungsten alloy has high durability, the lure 10 can be used for a long period of time if a tungsten alloy is used as the formation material for the sinker 4.

The sinker 4 is provided with the support 6. The support 6 is projected from the sinker 4 in the left and right direction. In this embodiment, the support 6 is projected from the lateral faces of the sinker 4 outwardly in the left and right direction. As the support 6 is on the above-described rails 3, the sinker 4 above the rails 3 is indirectly supported by the rails 3. A shape of the support 6 is not limited to a particular shape. However, a small contact area between the support 6 and rails 3 enables the sinker 4 to move more smoothly on the rails 3 in the front and back direction, and thus the support 6 is preferably in a shape of which the contact area with the rails 3 is as small as possible. Such a support 6 includes a rod-shaped shaft, for example.

In this embodiment, the support 6 includes a first shaft 61 projecting in the left and right direction on the front side of the sinker 4 and a second shaft 62 projecting in the left and right direction on the rear side of the sinker 4. As illustrated in FIG. 9A and FIG. 9B, the first shaft 61 is provided in such a manner that a shaft sufficiently longer than the width W of the sinker 4 is pressed into a first shaft hole 41 made inwardly in the left and right direction on the front side of the lateral faces of the sinker 4 such that ends of the shaft are projected from the sinker 4 outwardly in the left and right direction. Similarly, the second shaft 62 is provided in such a manner that a shaft sufficiently longer than the width W of the sinker 4 is pressed into a second shaft hole 42 made inwardly in the left and right direction on the rear side of the lateral faces of the sinker 4 such that ends of the shaft are projected from the sinker 4 outwardly in the left and right direction. A formation material for the support 6 is not limited to a particular material and can be the same as the formation material for the sinker 4 or the body 1.

A cross sectional shape of the first and second shafts 61, 62 (support 6) is not limited to a particular shape, and is preferably a shape of which the contact area with the rails 3 is as small as possible. Such a cross sectional shape includes a substantially circular shape, a substantially elliptical shape, and a substantially polygonal shape, and is preferably a substantially circular shape or a substantially elliptical shape (in this embodiment, a substantially circular shape is employed). When the cross sectional shape of the first and second shafts 61, 62 is in a substantially circular shape or a substantially elliptical shape, the contact area between the first and second shafts 61, 62 and the rails 3 is small, which thus enables the sinker 4 to move smoothly on the rails 3 in the front and back direction. The cross sectional shape of the first and second shafts 61, 62 may be the same or different from each other.

Further, the first and second shafts 61, 62 (support 6) may not be rotatable or may be rotatable. When the first and second shafts 61, 62 are not rotatable, the sinker 4 slides on the rails 3. When the first and second shafts 61, 62 are rotatable, the sinker 4 rolls on the rails 3. In this embodiment, the first and second shafts 61, 62 are provided in such a manner that shafts having substantially the same diameter as the first and second shaft holes 41, 42 are pressed into the shaft holes. For that reason, the first and second shafts 61, 62 are not rotatable. When the first and second shafts 61, 62 are provided as rotatable shafts, the first rail section 31 preferably inclines upward from the rear side to the front side (not illustrated). In this way, the sinker 4 is less likely to move to the second rail section 32 while casting the lure 10 in the air.

In the present invention, in a state where the sinker 4 is on the first rail section 31 or the second rail section 32, the sinker 4 is not in contact with the inner lower face 17 of the body 1 and the partition wall 19. Specifically, as illustrated in FIG. 8, in a state where the sinker 4 is on the second rail section 32, an airspace G1 formed between the lower face of the sinker 4 and the inner lower face 17 of the body 1 is preferably 1 mm to 5 mm, and an airspace G2 formed between the upper face of the sinker 4 and the partition wall 19 (second wall 192) is preferably 0.5 mm to 2 mm. Similarly, although not illustrated, in a state where the sinker 4 is on the first rail section 31, an airspace formed between the lower face of the sinker 4 and the inner lower face 17 of the body 1 is preferably 1 mm to 5 mm, and an airspace formed between the upper face of the sinker 4 and the partition wall 19 (first wall 191) is preferably 0.5 mm to 2 nm.

In the present invention, the sinker 4 on the rails 3 with the support 6 is not in contact with the inner lower face 17 of the body 1 and the partition wall 19, and thus the sinker 4 does not nib against the inner lower face 17 of the body 1 and the partition wall 19 when the sinker 4 moves on the rails 3 in the front and back direction. For that reason, the sinker 4 can move smoothly in the sinker moving space 2 in the front and back direction in the course of casting and making the lure 10 swim in water. Hereinafter, a movement of the sinker 4 will be described with reference to FIG. 10.

Figure 10A:
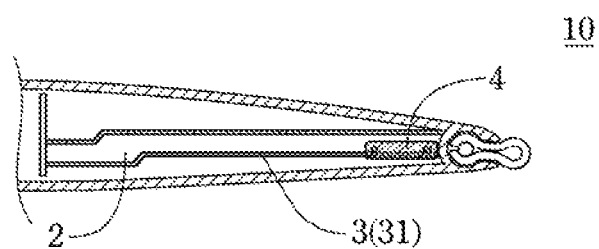
FIG. 10A is a vertical sectional view of the lure according to the first embodiment of the present invention illustrating a position of the sinker when the lure is casted.

First, the fishing line connecting portion 12 of the lure 10 is connected to a fishing rod by the fishing line, and then the fishing rod is held aloft to cast the lure 10. At this time, a strong inertial force is applied to the sinker 4, which makes the sinker 4 move to the rear side of the sinker moving space 2 (a rear end of the first rail section 31) as illustrated in FIG. 10A. With the sinker 4 positioned in the rear side of the sinker moving space 2, the lure 10 is casted in the air in a stable manner and also can be casted a long distance.

Figure 10B:
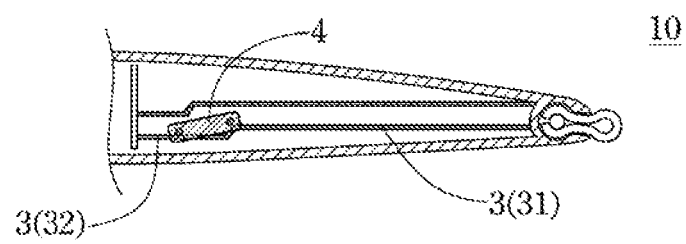
FIGS. 10B and 10C are vertical sectional views of the lure according to the first embodiment of the present invention each illustrating a position of the sinker after landing in water.
Figure 10C:
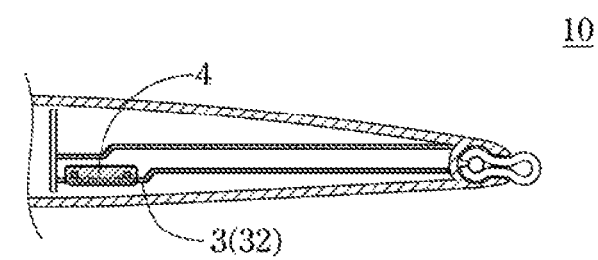

Next, when the fishing line is pulled after the lure 10 lands in water, the sinker 4 positioned in the rear end of the first rail section 31 moves to the front end of the first rail section 31, and the front end of the sinker 4 tilts toward the second rail section 32 as illustrated in FIG. 10B. The tilted sinker 4 slides straight down to the second rail section 32 and ends up on the second rail section 32 as illustrated in FIG. 10C. In this way, the sinker 4 moved to the second rail section 32 is held on the second rail section 32 by the above-described third rail section 51 (stopper 5) while the lure 10 swims in water. As a result, this enables the lure 10 to swim in a stable manner.

As illustrated in FIG. 8, a height G3 of the third rail section 51 (a height difference between the first rail section 31 and the second rail section 32) is preferably higher than the height H of the sinker 4. When the height G3 of the third rail section 51 is higher than the height H of the sinker 4, the sinker 4 can be more reliably held on the second rail section 32 while the lure 10 swims.

A ratio of the height G3 of the third rail section 51 and the height H of the sinker 4 (G3/H) is not limited to a particular ratio, and is preferably 6/5 to 3/1, more preferably 6/5 to 2/1, further preferably 6/5 to 3/2.

Figure 11:
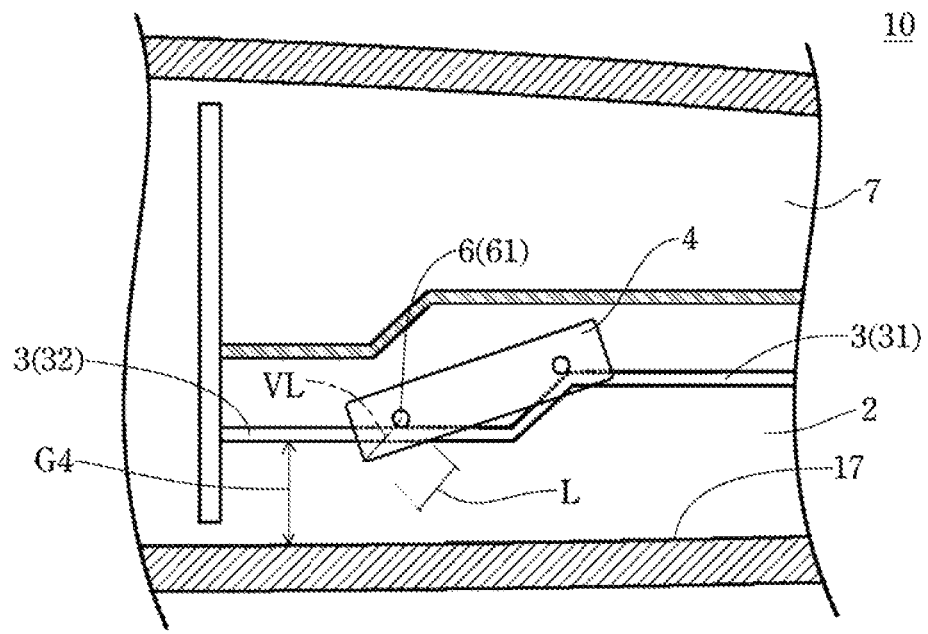
FIG. 11 is a partially enlarged vertical sectional view of FIG. 10B.

In the present embodiment, the sinker 4 is provided with the first and second shafts 61, 62 (support 6) on its lateral faces. Accordingly, a foremost lower end of the sinker 4 comes closest to the inner lower face 17 of the body 1 at the moment when the sinker 4 slides down to the second rail section 32, as illustrated in FIG. 11. In view of this, as illustrated in FIG. 11, it is preferable that a length L of a virtual line VL from the first shaft 61 to the foremost lower end of the sinker 4 is sufficiently shorter than a height difference G4 between the inner lower face 17 of the body 1 and the second rail section 32. When the length L of the virtual line VL is longer than the height difference G4, the foremost lower end of the sinker 4 collides with the inner lower face 17 of the body 1 at the moment when the sinker 4 slides down from the first rail section 31 to the second rail section 32. As a result, the sinker 4 or the body 1 may be broken or the sinker 4 may be caught on the inner lower face 17 of the body 1, which may stop the sinker 4 from moving to the second rail section 32.

Although a ratio of the length L of the virtual line VL and the height difference G4 (L/G4) is not particularly limited, the ratio is usually 1/3 to 5/6 and is preferably 2/3 to 5/6, more preferably 2/3 to 4/5. In FIG. 11, cross sections of the sinker 4 and the support 6 are not hatched as a matter of convenience.

As described above, in the lure 10 of the present invention, the sinker 4 is movable on the pair of rails 3 with the support 6 in the front and back direction, and the pair of rails 3 includes the first rail section 31 positioned in the rear side of the sinker moving space 2, and the second rail section 32 positioned in the front side of the sinker moving space 2, having the rear end positioned below the front end of the first rail section 31. This enables the sinker 4 to move smoothly on the second rail section 32 in the sinker moving space 2 after the lure 10 lands in water. The lure 10 of the present invention includes the stoppers 5 provided between the first rail section 31 and the second rail section 32. As a result, even when the lure 10 is moved right to left and up and down in water after landing, the sinker 4 is less likely to move from the second rail section 32 to the first rail section 31.

As the lure 10 of the present invention does not use a magnet as a retainer unlike a conventional lure, there is no possibility that the sinker 4 collides with the retainer, which eliminates a problem that the retainer is broken. Thus, the lure 10 of the present invention can be used for a long period of time in a stable manner.

Second Embodiment

In the second embodiment, the feature of the first rail section 31 is changed from that of the first embodiment.

Figure 12:
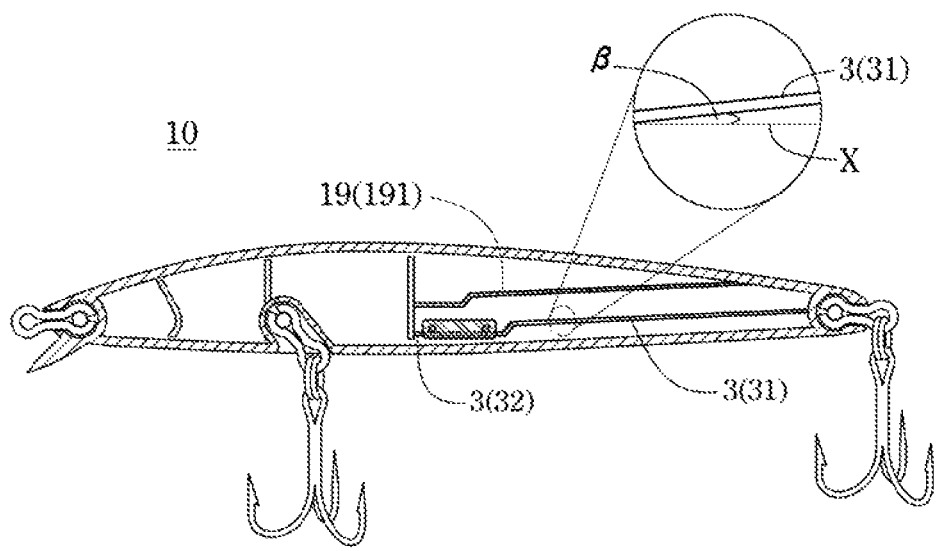
FIG. 12 is a vertical sectional view of a lure according to a second embodiment of the present invention.

In this embodiment, the first rail section 31 is provided so as to incline downward and forward from its rear side, as illustrated in FIG. 12. Inclining the first rail section 31 like this embodiment enables the sinker 4 to be more reliably moved to the second rail section 32 after the lure 10 lands in water. At first glance, it seems that the sinker 4 is less likely to move to the rear side of the sinker moving space 2 (or is less likely to become a state as illustrated in FIG. 10A) at the time of casing, when the first rail section 31 inclines downward and forward from its rear side. However, the fact is that when the fishing rod is held aloft at the time of casing, a large inertial force is applied to the sinker 4 to enable the sinker 4 to be sufficiently moved to the rear side of the sinker moving space 2 even when the first rail section 31 inclines to some extent.

When the first rail section 31 inclines too much, the sinker 4 may move to the second rail section 32 while casting the lure 10. In view of this, an interior angle β formed by an intersection of the first rail section 31 and the horizontal plane X running in the front and back direction is preferably more than 0° and 15° or less, more preferably more than 0° and 10° or less.

In this embodiment, although the first wall 191 inclines to be parallel to the first rail section 31 according to the inclination of the first rail section 31, the first wall 191 may be non-parallel to the first rail section 31 (not illustrated).

Third Embodiment

In the third embodiment, the feature of the partition wall 19 is changed from that of the first embodiment.

Figure 13A:
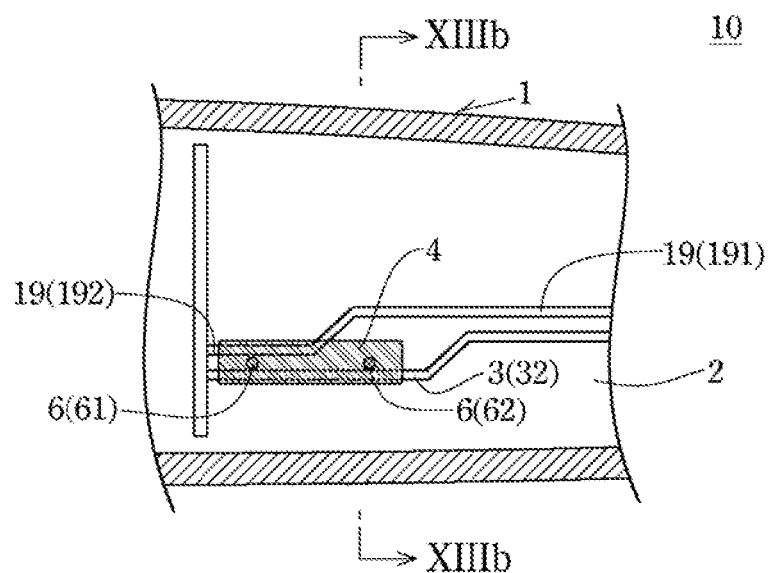
FIG. 13A is a vertical sectional view of a lure according to a third embodiment of the present invention.
Figure 13B:
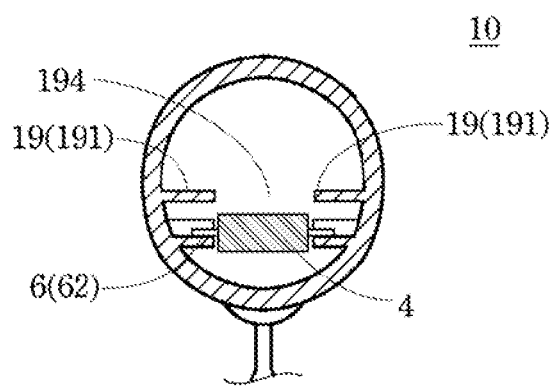
FIG. 13B is a vertical sectional view taken along a line XIIIb-XIIIb of the lure in FIG. 13A.

In this embodiment, the partition wall 19 is formed in a rail form as illustrated in FIG. 13A and FIG. 13B. In other words, the partition wall 19 of this embodiment has an opening section 194 running in the middle of the partition wall 19 in the front and back direction.

In this embodiment, a width of the opening section 194 is longer than the width of the sinker 4 and is shorter than the width of the support 6 (the first and second shafts 61, 62). Accordingly, as illustrated in FIG. 13A, a height of the second wall 192 can be made shorter than the upper face of the sinker 4 on the second rail section 32 (the same is true for the first wall 191). Like the first embodiment, the partition wall 19 in this embodiment can prevent the sinker 4 from moving out of the sinker moving space 2.

Fourth Embodiment

In the fourth embodiment, the feature of the stopper 5 is changed from that of the first embodiment.

Figure 14A:
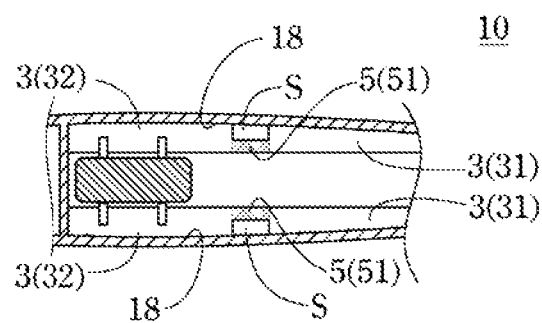
FIG. 14A is a horizontal sectional view of a lure according to a fourth embodiment of the present invention.
Figure 14B:
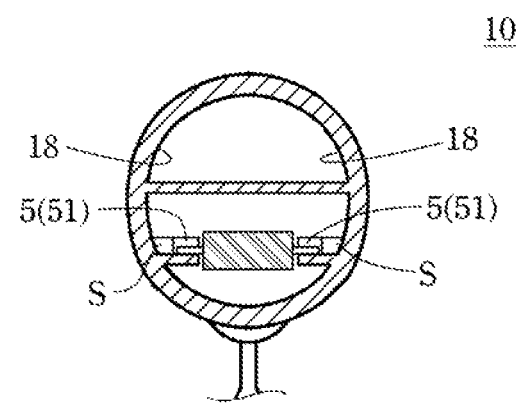
FIG. 14B is a vertical sectional view of the lure according to the forth embodiment of the present invention.

In the first embodiment, the third rail section 51 is used as the stopper 5. Like the first and second rail sections 31, 32, the third rail section 51 is a long projection projecting from the middle section of the pair of inner faces 18 of the sinker moving space 2 in the upper and lower direction. In this embodiment, on the other hand, the third rail section 51 is not projected from the pair of inner faces 18 of the sinker moving space 2, and an airspace S is formed between the third rail section 51 and the pair of inner faces 18, as illustrated in FIG. 14A and FIG. 14B. That is, in this embodiment, the third rail section 51 is provided from the front end of the first rail section 31 to the rear end of the second rail section 32, and is a plate-like member that is not in contact with the inner faces 18 of the body 1.

A rail width of the third rail section 51 is not limited to a particular width. However, a too short rail width may reduce a mechanical strength of the third rail section 51. In view of this, the rail width of the third rail section 51 is preferably ½ or more, more preferably ⅔ or more of a rail width of the first rail section 31 or the second rail section 32.

Even if the third rail section 51 is not projected from the pair of inner faces 18 of the sinker moving space 2 as in this embodiment, the sinker 4 can be held on the second rail section 32 as with the case of the first embodiment (see FIG. 8).

Although not particularly illustrated, the first and second rail sections 31, 32 can be formed such that the first and second rail sections 31, 32 are not projected from the pair of inner faces 18 of the sinker moving space 2 as with the case of the third rail section 51 of this embodiment. In this case, the first rail section 31 is a plate-like member running from the rear end of the sinker moving space 2 (from the rear end inside the body 1) to the rear end of the third rail section 51, and the second rail section 32 is a plate-like member running from the front end of the first rail section 31 to the front end of the sinker moving space 2 (reinforced member 11).

Fifth Embodiment

In the fifth embodiment, the feature of the stopper 5 is changed from that of the first embodiment.

Figure 15A:
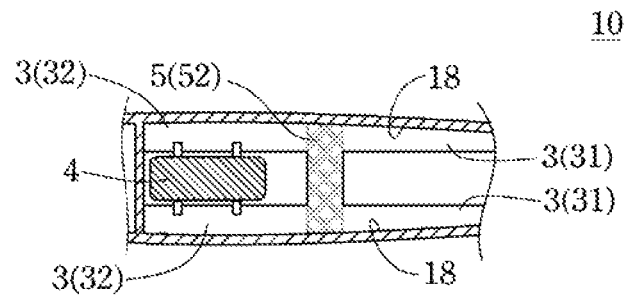
FIG. 15A is a horizontal sectional view of a lure according to a fifth embodiment of the present invention.
Figure 15B:
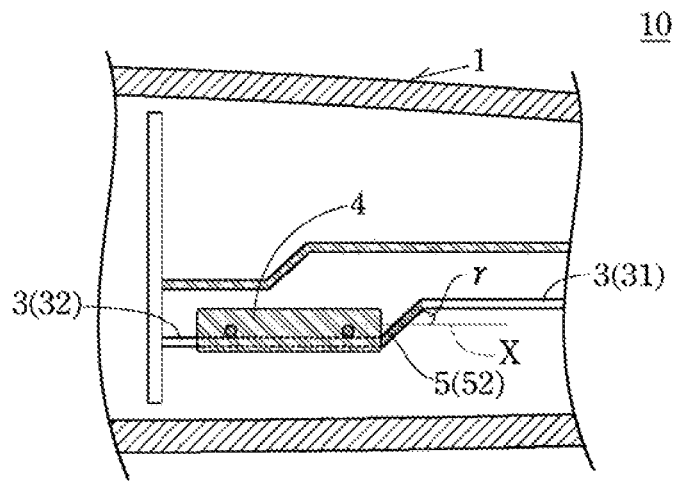
FIG. 15B is a vertical sectional view illustrating that the sinker is stopped by the stopper inside the lure according to the fifth embodiment of the present invention.

Although the third rail section 51 is used as the stopper 5 in the first embodiment, one piece of wall 52 provided from the front end of the first rail section 31 to the rear end of the second rail section 32 is used as the stopper 5, as illustrated in FIG. 15A and FIG. 15B. In this embodiment, a width of the wall 52 is the same as the width of the sinker moving space 2, and lateral ends of the wall 52 is connected to the pair of inner faces 18 of the body 1. The width of the wall 52 may be narrower than the width of the sinker moving space 2. In this case, although not particularly illustrated, the airspace as illustrated in the fourth embodiment is formed between the wall 52 and the pair of inner faces 18 of the sinker moving space 2.

In this embodiment, an inclination angle γ of the stopper 5 (wall 52) (an interior angle formed by an intersection of the wall 52 and the horizontal plane X running in the front and back direction) is not limited to a particular angle, and is usually 10 to 90°, preferably 10 to 80°, more preferably 20 to 60°.

In the first embodiment, the second shaft 62 as the support 6 of the sinker 4 collides with the stopper 5 (third rail section 51), which prevents the sinker 4 from moving further to the rear side than the stopper 5. In this embodiment, however, the wall 52 is used as the stopper 5. Thus, the rear end of the sinker 4 collides with the wall 52 as the stopper 5 as illustrated in FIG. 15B, which prevents the sinker 4 form moving to the rear side.

A formation material for the wall 52 is not limited to a particular material, and is preferably the same as the formation material for the body 1 or the rails 3. A thickness of the wall 52 is not limited to a particular thickness, and is preferably 0.5 mm to 2 mm, more preferably 1 mm to 2 mm, in terms of ensuring the mechanical strength.

Sixth Embodiment

In the sixth embodiment, the feature of the sinker 4 is changed from that of the first embodiment.

While the lateral faces of the sinker 4 in the first embodiment are parallel to the front and back direction, the lateral faces of the sinker 4 in this embodiment have parts that are not parallel to the front and back direction.

Figure 16:
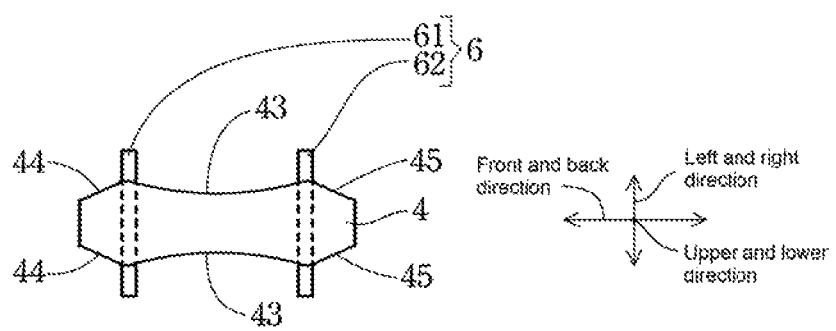
FIG. 16 is a top view of the sinker and the support used for a lure according to a sixth embodiment of the present invention.

Specifically, as illustrated in FIG. 16, a pair of first lateral faces 43 positioned between the first shaft 61 and the second shaft 62 of the sinker 4 have an inwardly curved surface, a pair of second lateral faces 44 positioned forward of the first shaft 61 have an inclined surface and are tapered from the rear side to front side, and a pair of third lateral faces 45 positioned backward of the second shaft 62 have an inclined surface and are tapered from the front side to the rear side. That is, in this embodiment, all the lateral faces of the sinker 4 are non-parallel to the front and back direction.

Figure 17A:
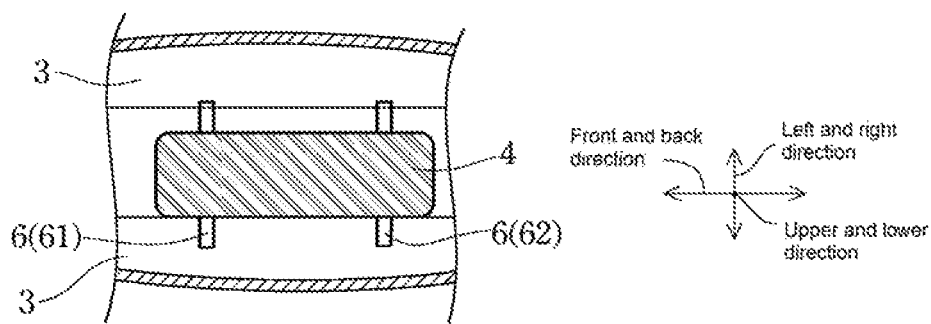
FIG. 17A is a horizontal sectional view illustrating the sinker and the support of the first embodiment leaning on a right side of the sinker moving space.
Figure 17B:
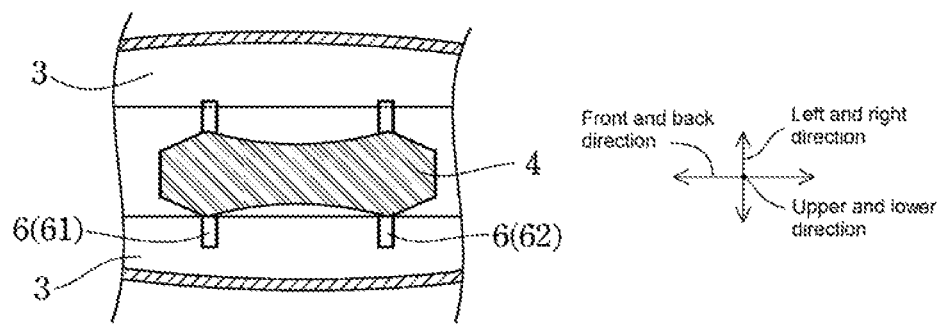
FIG. 17B is a horizontal sectional view illustrating the sinker and the support of a sixth embodiment leaning on the right side of the sinker moving space.

In the first embodiment, the lateral faces of the sinker 4 are parallel to the front and back direction. Thus, when the lure 10 is tilted to the right side, the lateral face of the sinker 4 collides with the rail 3 as illustrated in FIG. 17A (the same is true for the case where the lure 10 is tilted to the left side). However, in a case where the lateral faces of the sinker 4 have a part non-parallel to the front and back direction as in this embodiment, when the sinker 4 leans to the right side or the left side due to a tilting of the lure 10, the contact area between the sinker 4 and rails 3 can be reduced significantly as compared to that of the first embodiment (see FIG. 17B). Accordingly, the sinker 4 can move smoothly in the front and back direction as compared to the first embodiment.

Seventh Embodiment

In the seventh embodiment, the feature of the sinker 4 is changed from that of the first embodiment.

Figure 18A:
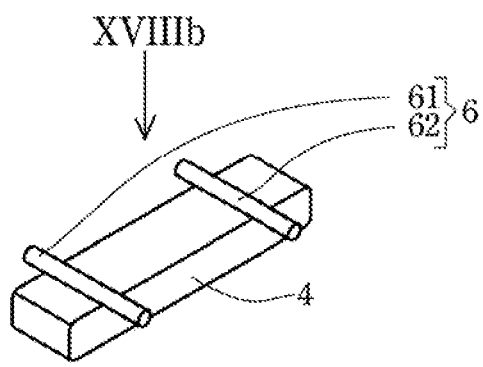
FIG. 18A is a perspective view of the sinker and the support used for a lure according to a seventh embodiment of the present invention.
Figure 18B:
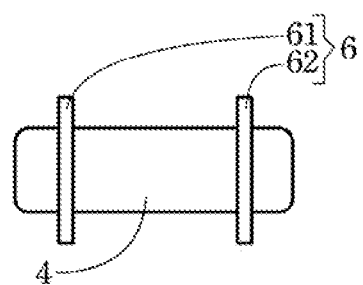
FIG. 18B is a top view of the sinker and the support in FIG. 18A viewed from a direction indicated by an arrow XVIIIb.

Although the support 6 of the first embodiment is projected from the lateral faces of the sinker 4 outwardly in the left and right direction, the support 6 (first shaft 61 and second shaft 62) of this embodiment is projected from an upper face of the sinker 4 outwardly in the left and right direction as illustrated in FIG. 18A and FIG. 18B.

As the support 6 is projected from the upper face of the sinker 4 outwardly in the left and right direction in this embodiment, the sinker 4 can be positioned further below than the case of the first embodiment when the sinker 4 is on the rails 3. Accordingly, the center of gravity of the lure 10 is likely to be positioned lower, and this enables the lure 10 to swim in a more stable manner.

Eighth Embodiment

In the eighth embodiment, the feature of the second rail section 32 is changed from that of the first embodiment.

In this embodiment, a stopper (hereinafter, a stopper provided in the front side of the second rail section 32 is referred to as a second stopper 8 with the purpose of distinguishing the second stopper 8 from the stopper 5 provided between the first rail section 31 and the second rail section 32) for stopping the first shaft 61 of the sinker 4 is provided in a middle section of the second rail section 32 in the front and back direction.

Figure 19A:
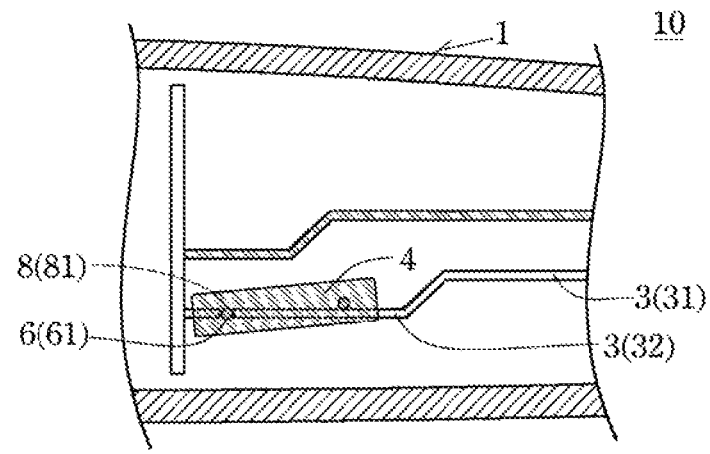
FIGS. 19A and 19B are vertical sectional views of a lure according to an eighth embodiment of the present invention.
Figure 19B:
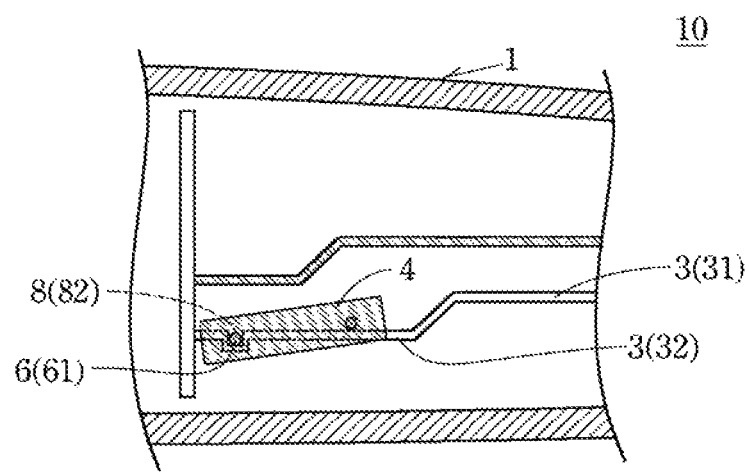

A second stopper 8 may be a slit 81 in which the first shaft 61 can get caught as illustrated in FIG. 19A, or a stepped portion 82 in which the first shaft 61 can get caught as illustrated in FIG. 19B.

Providing the second stopper 8 allows the sinker 4 moved from the first rail section 31 to the second rail section 32 after landing in water to be more firmly held on the second rail section 32. Thus, even if the lure 10 is vigorously moved from right to left and up and down in water, the sinker 4 is much less likely to move from the first rail section 31 to the second rail section 32.

A depth of the slit 81 and the stepped portion 82 is not limited to a particular depth on the condition that the first shaft 61 can get caught, and is preferably 1.1 to 2.0 times, more preferably 1.1 to 1.5 times as large as a diameter of the first shaft 61.

Ninth Embodiment

In the ninth embodiment, the feature of the sinker 4 is changed from that of the first embodiment.

Although the first and second shafts 61, 62 (support 6) in the first embodiment are provided as being not rotatable, the first and second shafts 61, 62 in this embodiment are provided as being rotatable.

Figure 20A:
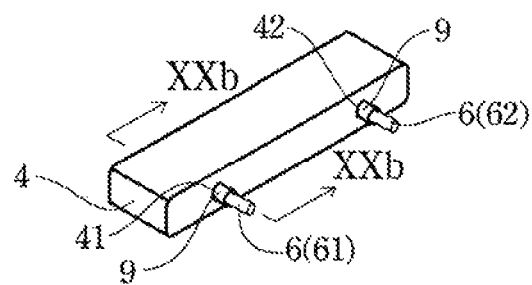
FIG. 20A is a perspective view of the sinker and the support used for a lure according to a ninth embodiment of the present invention.
Figure 20B:
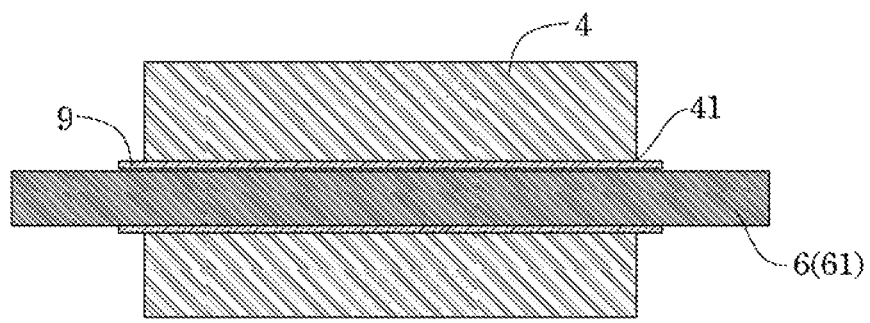
FIG. 20B is a vertical sectional view taken along a line XXb-XXb of the sinker and the support in FIG. 20A.

Specifically, as illustrated in FIG. 20A and FIG. 20B, a tubular member 9 having substantially the same diameter as the inner diameter of the first shaft hole 41 is inserted into the first shaft hole 41 of the sinker 4. In this embodiment, the tubular member 9 is a tube having a width wider than the first shaft hole 41 and having ends projecting outwardly in the left and right direction from the first shaft hole 41. Into this tubular member 9, the first shaft 61 having a diameter smaller than an inner diameter of the tubular member 9 is inserted. Therefore, the first shaft 61 is rotatable. Similarly, the tubular member 9 and the second shaft 62 are inserted into the second shaft hole 42, and the second shaft 62 is rotatable. A lubricant may be applied to an inner surface of the tubular member 9 to make the first shaft 61 and the second shaft 62 rotate easily.

Figure 21A:
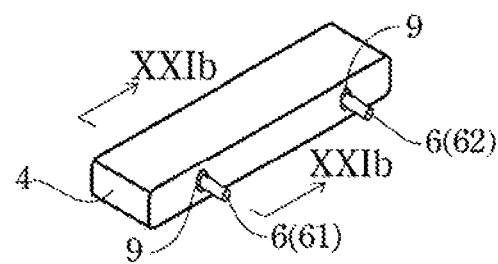
FIG. 21A is a perspective view of the sinker and the support used for a lure according to a ninth embodiment of the present invention.
Figure 21B:
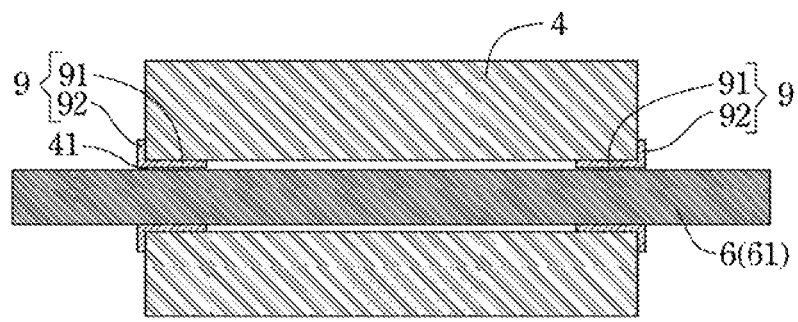
FIG. 21B is a vertical sectional view taken along a line XXIb-XXIb of the sinker and the support in FIG. 21A.

A width of the tubular member 9 may be wider than the width of the first and second shaft holes 41, 42 as illustrated in FIG. 20A and FIG. 20B, and can be substantially the same as or narrower than the width of the first and second shaft holes 41, 42. As a tubular member 9 having a width sufficiently narrower than the width of the first and second shaft holes 41, 42, a grommet-like tubular member 9 as illustrated in FIG. 21A and FIG. 21B can be used, for example.

Specifically, the grommet-like tubular member 9 has a tube 91 having a sufficiently narrower width than the first and second shaft holes 41, 42 and a flange 92 protrudingly provided at ends of the tube 91. The flange 92 comes into contact with the lateral face of the sinker 4 to prevent the tube 91 from not getting into the first and second shaft holes 41, 42 any further. As illustrated in FIG. 21B, the grommet-like tubular member 9 is inserted into a right end of the first shaft hole 41 and a left end of the first shaft hole 41, respectively. An inner diameters of these two tubular members 9 are larger than the diameter of the first shaft 61, and thus the first shaft 61 inserted into the first shaft hole 41 is rotatable. The same is true for the second shaft 62.

When the support 6 is provided as being rotatable as in this embodiment, the sinker 4 easily moves to the rear side of the sinker moving space 2 (first rail section 31) when the lure 10 is pulled out of water. That is, when the lure 10 is pulled out of the water, the lure 10 is in an upright position (a position of which the front end of the lure 10 illustrated in FIG. 1 faces upward and the rear end thereof faces downward), and consequently the sinker positioned in the front side (on the second rail section 32) falls down and move to the first rail section 31. Accordingly, the sinker 4 can be reliably positioned in the rear side of the sinker moving space 2 before re-casting the lure 10.

The lure 10 of the present invention is not limited to the specific features described in the first to ninth embodiments, and can be appropriately changed in terms of its design by combining features of each embodiment within an intended scope of the present invention.

For example, the sinker 4 of the second embodiment may be changed to the sinker 4 of the seventh embodiment or the eighth embodiment, and the rails 3 (first rail section 31) of the third embodiment may be inclined as with the case of the second embodiment.

10 Lure
1 Body
2 Sinker moving space
3 Rails
31 First rail section
32 Second rail section
4 Sinker
5 Stopper
51 Third rail section
52 Wall
6 Support
61 First shaft
62 Second shaft

The invention claimed is:

1. A lure comprising:
a body;
a sinker moving space running in a front and back direction inside the body;
a pair of rails provided in the sinker moving space, running in the front and back direction;
a sinker housed in the sinker moving space, wherein the sinker has front end and a rear end; and
a support projecting in a left and right direction of the sinker,
the sinker being movable on the pair of rails with the support in the front and back direction, and
the pair of rails each including:
a first rail section positioned in a rear side of the sinker moving space; and
a second rail section positioned in a front side of the sinker moving space, having a rear end positioned below a front end of the first rail section, wherein a stopper capable of stopping the sinker is provided between the first rail section and the second rail section, and wherein the support includes a first shaft extending into the sinker and having opposing portions projecting from the sinker respectively in the left and right directions of the sinker on a front side of the sinker so that the first shaft is spaced rearwardly from the front end, and a second shaft extending into the sinker and having opposing portions projecting from the sinker respectively in the left and right directions of the sinker on a rear side of the sinker so that the second shaft is spaced forwardly from the rear end.

2. The lure according to claim 1, wherein the stopper includes a third rail section positioned between the second rail section and the first rail section, the third rail section running downward from the front end of the first rail section.

* * * * *